May 29, 1934.  A. J. CAWLEY  1,960,696
WINDSHIELD
Filed Feb. 7, 1930
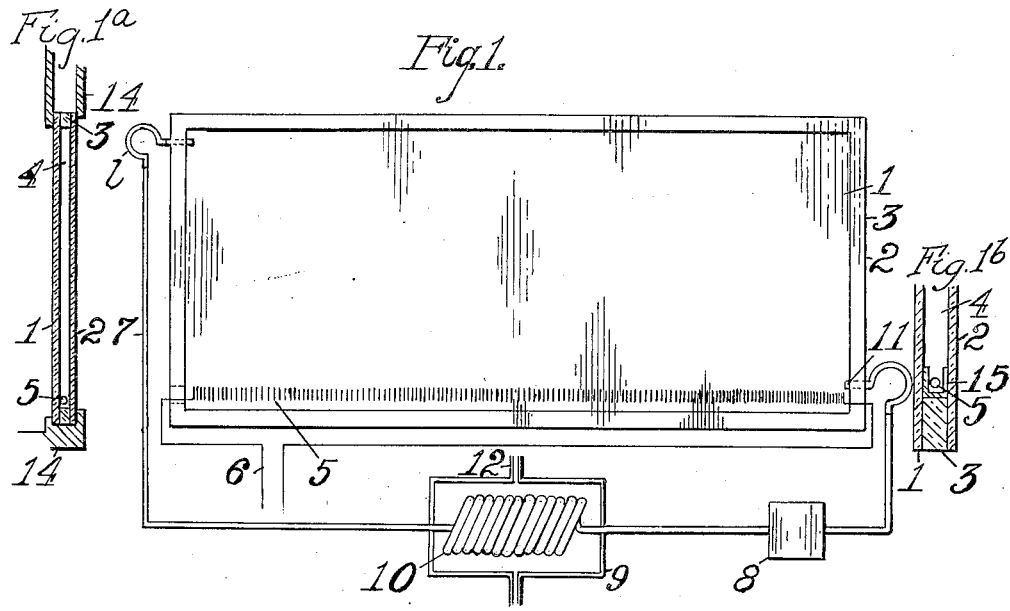
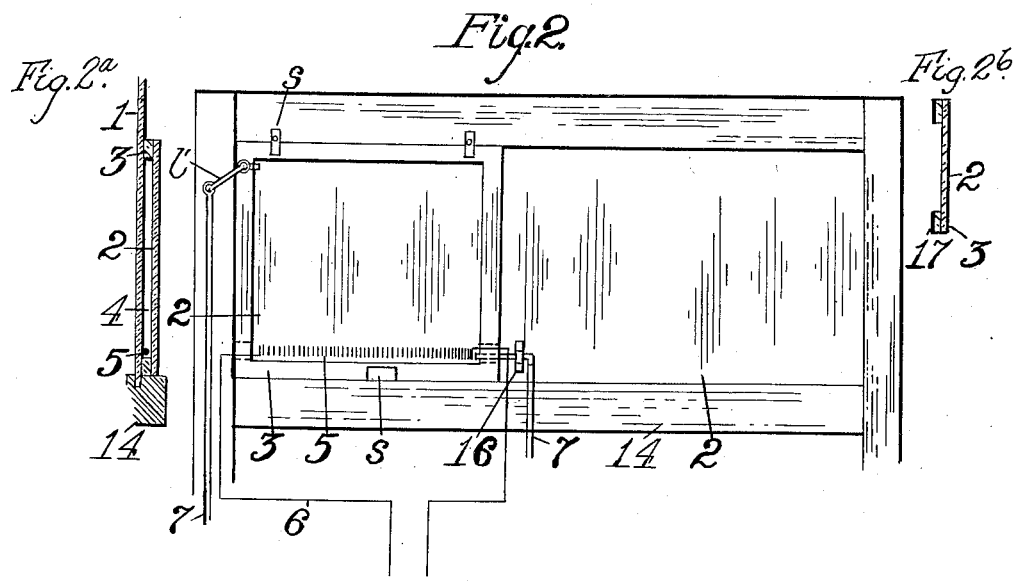
INVENTOR
Aloysius J. Cawley Patented May 29, 1934

1,960,696

UNITED STATES PATENT OFFICE 1,960,696

WINDSHIELD

Aloysius J. Cawley, Pittston, Pa.

Application February 7, 1930, Serial No. 426,714

7 Claims. (Cl. 20—40.5)

The invention relates to a new type of wind shield, which is virtually a glass chamber containing warm, dry air. Thus, the shield is always at a temperature above that of the outside air and also above freezing point. Snow or sleet falling upon this type of wind shield is immediately melted and evaporated, while rain drops and other moisture are immediately dried. The shield is therefore clear and transparent in all sorts of weather. It also possesses the advantage that there is no condensation of moisture on the face of the shield that is inside the car.

More particularly the invention relates to a light transmitting means that is composed of two panes of glass or other suitable media which enclose an air space. This space is heated by a heater which may be contained therein or by a heater that is external thereto and supplied by the exhaust gases from the motor exhaust or by the radiator liquid. In the latter two arrangements, pipes conduct the air to and from the heater.

This type of window pane may be employed in the rear window of automobiles, as well as in the wind shield, and as a matter of fact it may be used in all windows of the automobile. The invention is broad enough to cover this type of window pane in all buildings, locomotives, cars, steamships, or in fact anywhere that window panes are used. It is not limited to automobile shields, but is very desirable therein.

A type of wind shield is also described that may be attached to the ordinary wind shield in an automobile.

Reference is to be had to the accompanying drawing forming part of this specification, in which like reference characters have similar meanings in all of the views, and in which, Figure 1 is an elevational view of one modification of the shield, which shows it to be provided with an internal heater electrically operated from the dynamo or storage battery circuit, and also provided with a means for circulating the air to and from an external heater.

Figure 1a is a view in cross-section which illustrates the mode of enclosing and heating the air.

Figure 1b is a partial cross-sectional view of the shield showing the heater surrounded by heat insulators.

Figure 2 is an elevational view of a modification of the invention which is concerned with the provision of a shield which may be attached to an ordinary shield. Heating and circulating means are also illustrated.

Figure 2a is a cross sectional view of Figure 2.

Figure 2b is a cross sectional view of a heater that is intended to be attached to an ordinary wind shield by means of suction.

Figure 1 is an illustration of a wind shield which is composed of more than one pane of glass. 1 designates the anterior sheet of glass, which faces the external air. 3 is a spacing means, which may be a strip of glass of suitable thickness. The rear pane of glass, which faces the inside of the car is illustrated by 2. Thus, one modification of the invention may consist simply of panes of glass 1 and 2 cemented to the glass frame 3. The air in the air space 4 may be thoroughly dried before being inserted or admitted to this space. Also this chamber may be provided with air drying means such as calcium chloride, if desired. This pane of glass may be used in all places where glass is used, whether in houses, automobiles, or the like. The air in space 4 is always dry and uninfluenced by the humidity of the external air.

However, it is particularly desired to describe the modification in which the window pane just described is provided with heating means. There are several ways of accomplishing this. In one modification, an electrical heater 5 is used, which heats the air at the base of the space 4. The heated air rises by convection, and as it is cooled by the plates 1 and 2, it again gravitates down and is reheated by heater 5. Wires such as 6 may be admitted to space 4 in any manner desired. A very small opening may be provided to space 4 to permit of compensation for expansion and contraction. The anterior plate of glass 1 may be made thinner than the posterior plate 2. Obviously, the heat generated by heater 5 cannot pass through the glass by radiation, as this is the same principle utilized in hot house construction. No heat can pass through the plate by convection, as a circulating medium such as air is necessary. The only means left for transmitting heat through the glass is by conduction. There is a greater difference of temperature between the forward plate and the external air than there is between the rear plate and the air in the car. Thus, it will be evident that the main loss of heat is just where it is desired to have it, i. e., between the forward plate and the external air. This may be made still more intense by making the forward, or outside plate thinner than the rear. An opening may be made in element 3 that is sufficiently large to permit the insertion and extraction of the heater 5 for purposes of repairs, etc.

Another embodiment of the invention is concerned with the use of an external heater, such as that consisting of a coil of pipes 10 through which is circulated by the pump 8 the air contained in space 4, the air being conducted to the heater 9 by means of pipes 7, which may be provided with suitable flexible links 1. Either the gases from the engine or the cooling liquid of the radiating system may be circulated through the casing 9 by pipes 12. If space 4 is made air-tight, and pump 8 so operated as to draw the air through 11 to the heater and thence to pipes 7 to the air space 4, a partial vacuum will be provided in the space 4 which will compensate for the expansion of the air due to heating.

It is to be emphasized that the air space 4 may be air tight, or provided with a very small opening or openings to the external air, or with a large opening permitting the extraction and introduction of the heater 5 as desired.

Figure 1a shows the windshield as it is contained in an ordinary automobile window casing, the latter being indicated by 14. The flexible link 1 permits raising or lowering the wind shield or moving it forwards or backwards.

Figure 1b is intended to disclose the fact that a suitable heat insulation, such as a strip of asbestos, may be interposed between the heater and the surrounding structures, such as plates 1 and 2.

Figure 2 shows another modification of the invention. This consists of a plate of glass with the suitable frame, which may be attached to the rear surface of an ordinary window surface. This may be used in buildings, cars, ships, automobiles, or wherever windows are now used. This is intended to make the invention adaptable to an ordinary wind shield, merely attaching it to the window in a few minutes. The ordinary wind shield 2 is shown in its frame 14. The spacing means is shown at 3. This, together with the posterior surface of the shield constitute a virtual glass box without a lid. The regular wind shield constitutes the lid to this box. The illustration shows a small heated shield attached to the ordinary shield. Obviously, the heated shield may assume any proportion desired, from that covering a small portion of the ordinary shield to one covering the entire ordinary shield. It may be held in place mechanically, or by use of cement, or by means of suction, etc. Mechanical means in the form of stops 3 may be used. Space 4 here may again be made absolutely air tight, or with any degree of opening desired. A heater 5 may be provided with its conducting wires passing to the battery, generator, etc. Or, the air may be extracted from space 4 by pipe 7 by means of pump, driven to a heater and thence returned by pipes 7 to the air space 4. Any flexible connections may be provided in the pipe line 7, such as adjustable link 1', or flexible union 16. This heater may be removed when desired.

Figure 2a shows the ordinary wind shield 1 to which is attached the spacer 3 and the posterior or inside window pane 2. The heater is shown at 5. The ordinary casing is shown by reference character 14.

Figure 2b shows a modification of the invention which consists of a plate 2 with spacing means 3. On the face of 3 a rubber strip 17 is shown. By applying this to the ordinary wind shield with pressure, it will be made to adhere, and is readily removed or applied as desired. The spacing strip may also be attached with cement obviously.

In the form of the invention consisting of a heated body of air in 4, it will be noted that this body of air is placed between two bodies of air of lower temperature, namely the air outside the car, or building and the air inside the car or building. In order to have steam or moisture condense on a pane of glass it is necessary to have both hot air and moisture in contact with the pane of glass. Since the air in space 4 has been deprived of all of its moisture, this hot air may not be made to deposit moisture by means of the cooling action of either the outside or inside air, consequently moisture or mist cannot be made to accumulate on either plate 1 or 2.

Having described my invention, I claim as new and desire to secure by Letters Patent:

1. In combination: two sheets of transparent media separated by a hollow square of glass acting to enclose a body of transparent gas means for drying said glass located therein, and a small vent in one of said media.

2. In combination: two sheets of transparent media, one of said sheets being thinner than the other of said media, said sheets being separated by a hollow square of glass.

3. In combination: two sheets of transparent media, said sheets being separated by a hollow square of glass acting to enclose a body of transparent gas, and means for heating said gas located therein.

4. In combination a sheet of glass, a hollow square attached to said sheet of glass and forming a chamber therewith, a sheet of rubber attached to said hollow square to form a vacuum tight joint between said sheet and a window pane or wind shield to which it is desired to attach said sheet, thus enclosing a body of air between said sheet and said pane.

5. In combination, a wind shield, a hollow chamber in said shield containing a body of purified transparent gas, a heater external to said shield, a closed circuit consisting of tubing or the like and comprising two arms, said closed circuit not taking in any appreciable external air, one of said arms connecting the upper portion of said chamber with said heater and the other of said arms connecting the lower portion of said heater with said chamber in order that said transparent gas may be circulated by means of convection currents.

6. In combination, a wind shield, a hollow chamber in said shield containing a body of purified transparent gas, a heater external to said shield, a closed circuit consisting of tubing or the like and comprising two arms, said closed circuit having no communication with the external atmosphere, one of said arms connecting said chamber with said heater and the other of said arms connecting said heater with said chamber and a circulator contained in said circuit for circulating said gas between said chamber and said heater.

7. A wind shield consisting of a pair of sheets of glass separate by a hollow square of glass said shield forming an air-tight chamber and a heater in said air tight chamber.

ALOYSIUS J. CAWLEY.